(12) United States Patent
Dabak et al.

(10) Patent No.: US 11,822,951 B2
(45) Date of Patent: Nov. 21, 2023

(54) HYPERCALL AUTHENTICATION IN A GUEST-ASSISTED VIRTUAL MACHINE INTROSPECTION (VMI) IMPLEMENTATION

(71) Applicant: VMWARE, INC., Palo Alto, CA (US)

(72) Inventors: Prasad Sharad Dabak, Pune (IN); Leena Shuklendu Soman, Pune (IN)

(73) Assignee: VMWARE, INC., Palo Alto, CA (US)

( * ) Notice: Subject to any disclaimer, the term of this patent is extended or adjusted under 35 U.S.C. 154(b) by 583 days.

(21) Appl. No.: 16/939,330

(22) Filed: Jul. 27, 2020

(65) Prior Publication Data
US 2021/0389965 A1    Dec. 16, 2021

(30) Foreign Application Priority Data
Jun. 10, 2020   (IN) .............................. 202041024348

(51) Int. Cl.
| | |
|---|---|
| *G06F 9/455* | (2018.01) |
| *G06F 9/48* | (2006.01) |
| *G06F 21/57* | (2013.01) |
| *G06F 21/64* | (2013.01) |
| *G06F 9/38* | (2018.01) |

(52) U.S. Cl.
CPC ........ *G06F 9/45558* (2013.01); *G06F 9/3806* (2013.01); *G06F 9/45545* (2013.01); *G06F 9/485* (2013.01); *G06F 21/577* (2013.01); *G06F 21/64* (2013.01); *G06F 2009/45583* (2013.01); *G06F 2009/45587* (2013.01)

(58) Field of Classification Search
CPC ............... G06F 9/45558; G06F 9/3806; G06F 9/45545; G06F 9/485; G06F 21/577; G06F 21/64; G06F 2009/45583; G06F 2009/45587; G06F 21/53; G06F 21/554; G06F 21/566

See application file for complete search history.

(56) References Cited

U.S. PATENT DOCUMENTS

| | | | |
|---|---|---|---|
| 6,330,588 B1 * | 12/2001 | Freeman ............... | G06F 9/4862 709/202 |
| 9,292,328 B2 * | 3/2016 | Pratt .................... | G06F 9/45545 |
| 9,531,547 B2 * | 12/2016 | Dabak ................... | H04L 9/3247 |
| 10,620,985 B2 | 4/2020 | Dabak et al. | |
| 10,726,127 B1 * | 7/2020 | Steinberg .............. | G06F 21/566 |
| 2010/0281273 A1 * | 11/2010 | Lee ......................... | F04B 33/00 713/193 |

(Continued)

FOREIGN PATENT DOCUMENTS

DE      102012203521 A1 *  10/2012  ............. G06F 21/12

OTHER PUBLICATIONS

Hebbal et al, Virtual Machine Introspection: Techniques and Applications, 10th International Conference on Availability, Reliability and Security, (Year: 2015).*

(Continued)

*Primary Examiner* — Bruce S Ashley
(74) *Attorney, Agent, or Firm* — SU IP CONSULTING (57) ABSTRACT

Example methods are provided to use a guest monitoring mode (GMM) module in a hypervisor to authenticate hypercalls sent by a guest agent to the GMM module. The GMM module uses reference information, including thread information associated with a thread, to determine whether a hypercall associated with the thread was issued by the trusted guest agent or by potentially malicious code.

21 Claims, 5 Drawing Sheets

(56) References Cited

U.S. PATENT DOCUMENTS

2016/0199731 A1* 7/2016 Mamtani ................ A63F 13/35
                                                        463/42
2018/0349603 A1* 12/2018 Yamada ................ G06F 21/554
2019/0235934 A1* 8/2019 Chanda .................. G06F 21/56

OTHER PUBLICATIONS

Jain et al, SoK: Introspections on Trust and the Semantic Gap, IEEE Symposium on Security and Privacy (Year: 2014).*

* cited by examiner

HYPERCALL AUTHENTICATION IN A GUEST-ASSISTED VIRTUAL MACHINE INTROSPECTION (VMI) IMPLEMENTATION

RELATED APPLICATIONS

Benefit is claimed under 35 U.S.C. 119(a)-(d) to Foreign Application Serial No. 202041024348 filed in India entitled "HYPERCALL AUTHENTICATION IN A GUEST-ASSISTED VIRTUAL MACHINE INTROSPECTION (VMI) IMPLEMENTATION", on Jun. 10, 2020, by VMware, Inc., which is herein incorporated in its entirety by reference for all purposes.

BACKGROUND

Unless otherwise indicated herein, the approaches described in this section are not admitted to be prior art by inclusion in this section.

Virtualization allows the abstraction and pooling of hardware resources to support virtual machines in a software-defined networking (SDN) environment, such as a software-defined data center (SDDC). For example, through server virtualization, virtualization computing instances such as virtual machines (VMs) running different operating systems (OSs) may be supported by the same physical machine (e.g., referred to as a host). Each virtual machine is generally provisioned with virtual resources to run an operating system and applications. The virtual resources may include central processing unit (CPU) resources, memory resources, storage resources, network resources, etc.

However, a virtualized computing environment having hosts that support VMs is often vulnerable to malware, viruses, rootkits, spyware, or other types of malicious code. To protect against such malicious code, virtualized computing environments typically implement some sort of defense mechanism. Nevertheless, defense mechanisms implemented in virtualized computing environments can sometimes be rendered ineffective or inefficient by malicious code.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. The aspects of the present disclosure, as generally described herein, and illustrated in the drawings, can be arranged, substituted, combined, and designed in a wide variety of different configurations, all of which are explicitly contemplated herein.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, such feature, structure, or characteristic may be effected in connection with other embodiments whether or not explicitly described.

The present disclosure addresses potential drawbacks in defense systems for virtualized computing environments. For example in a virtualized computing environment that implements a virtual machine introspection (VMI) technique, a guest monitoring mode (GMM) module operates in conjunction with a guest agent that resides in a virtual machine (VM). The guest agent loads very early in the boot sequence of the VM and assumes a root of trust role. As part of the VMI process, the guest agent then gathers context information about the VM and provides this context information to the GMM module using a hypercall. The context information may include various kernel data structure offsets, running processes of the kernel of the guest operating system (OS), system call tables, locations of kernel components (e.g., functions, process lists, module lists, etc.), or other information.

The guest agent also registers various hooks with the guest OS so that the guest agent is notified whenever certain events occur in the VM, such as the creation, start, exit, etc. of a process. When these events are triggered in the VM, the registered hooks enable the guest agent to be notified by the guest OS, and then the guest agent is able to make a hypercall to the GMM module so as to inform the GMM module of these events that are transpiring in the VM (e.g., live-state information of the guest). The GMM module can then reconcile (e.g., check) this live-state information from the guest agent against information maintained/monitored by the GMM module, such as via a comparison of the information from the guest agent against a process list maintained by the GMM module or via comparison of the information from the guest agent against live-state information in the memory of the VM which is introspected by the GMM module.

Thus, for security purposes, the GMM module is able to determine that potentially malicious code may have compromised the VM, in a situation where the live-state information as monitored by the GMM module from the memory of the VM (or from the process list maintained by the GMM module) does not match the live-state information as reported by the guest agent via the hypercall—the GMM module can then initiate remedial action. Analogously, the GMM module may determine that potentially malicious code is not executing or is not present, in a situation where the live-state information as monitored by the GMM module from the memory of the VM (or from the process list maintained by the GMM module) does match the live-state information as reported by the guest agent via the hypercall.

In some virtual computing environments, a hypercall for use in connection with VMI is typically implemented using an IN instruction on a specifically designated input/output (I/O) port (e.g., a backdoor port). Parameters for a hypercall from a guest agent are typically passed in registers and/or in memory areas that are pointed to by registers. One possible problem in such a VMI implementation is that any code running in the VM (including potentially malicious code) can execute the IN instruction and issue a hypercall. Thus, the potentially malicious code can potentially issue a hypercall that provides wrong/false or other maliciously modified information to the GMM module, with the GMM module then erroneously assuming that such hypercall is originating from a trusted guest agent. As a result, the GMM module may erroneously conclude that malicious code is not present in the VM, and so GMM module unintentionally allows the potentially malicious code to continue execution in a manner that could cause detrimental effects in the VM.

The present disclosure provides various techniques for the GMM module to verify/determine that hypercalls are originating from the (trusted) guest agent and not from potentially malicious code running in the VM. If the GMM module determines that the hypercalls originated from code (e.g., potentially malicious code) other than the guest agent, then the GMM module can fail the hypercalls and/or send an alert to take remedial action. Reference throughout this disclosure to malicious code is understood to include potentially malicious code or actual malicious code (e.g., code that is verified to be malicious).

Computing Environment

To further explain the operations of the GMM module in conjunction with the guest agent to verify the authenticity of hypercalls or other communication from the guest agent to the GMM module, various implementations will now be explained in more detail using FIG. 1, which is a schematic diagram illustrating an example virtualized computing environment 100 that can implement a method to authenticate hypercalls. Depending on the desired implementation, virtualized computing environment 100 may include additional and/or alternative components than that shown in FIG. 1.

Figure 1:
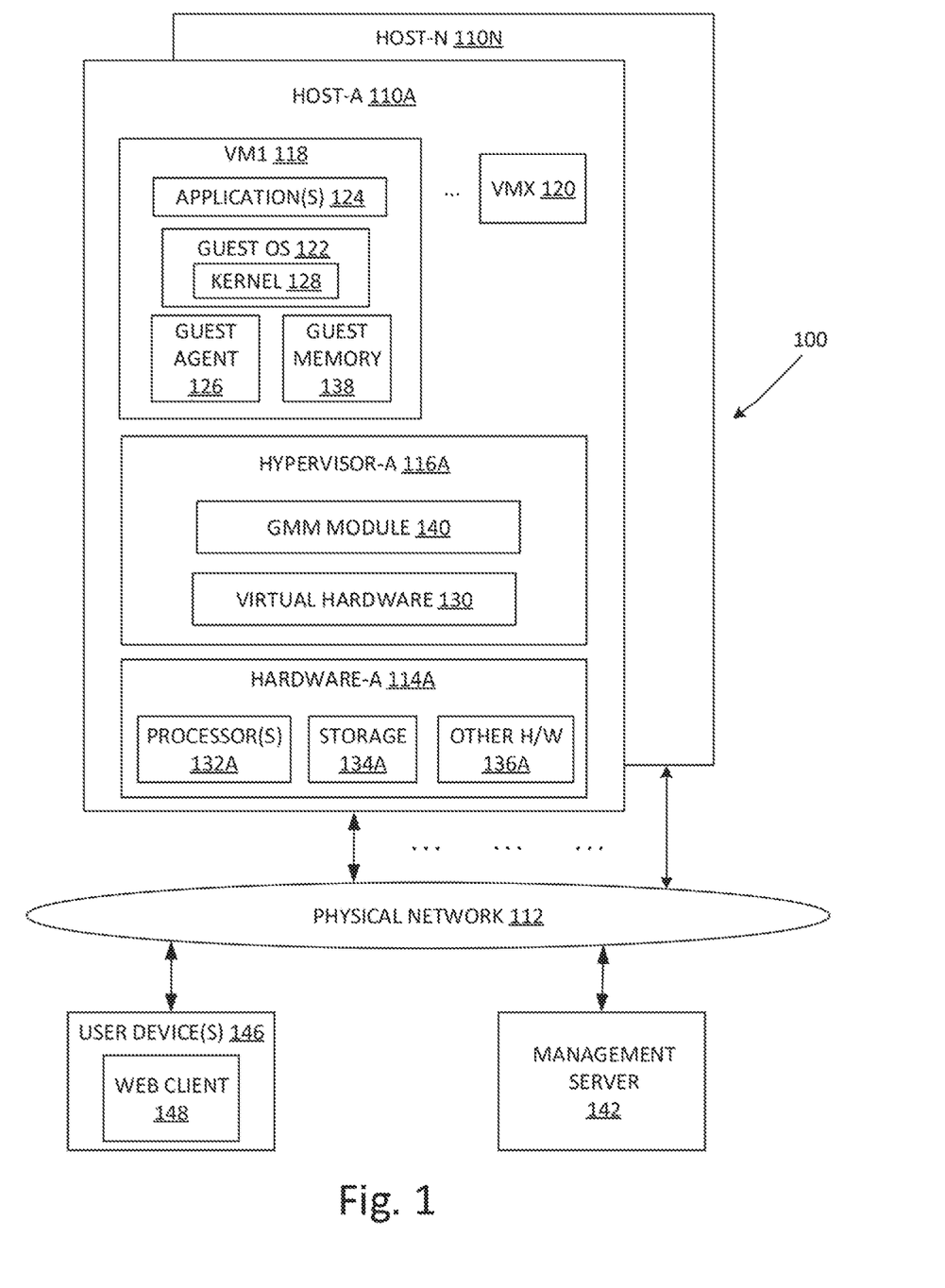
FIG. 1 is a schematic diagram illustrating an example virtualized computing environment that can implement a method to authenticate hypercalls.

In the example in FIG. 1, the virtualized computing environment 100 includes multiple hosts, such as host-A 110A host-N 110N that may be inter-connected via a physical network 112, such as represented in FIG. 1 by interconnecting arrows between the physical network 112 and host-A 110A host-N 110N. Examples of the physical network 112 can include a wired network, a wireless network, the Internet, or other network types and also combinations of different networks and network types. For simplicity of explanation, the various components and features of the hosts will be described hereinafter in the context of the host-A 110A. Each of the other host-N 110N can include substantially similar elements and features.

The host-A 110A includes suitable hardware 114A and virtualization software (e.g., a hypervisor-A 116A) to support various virtual machines (VMs). For example, the host-A 110A supports VM1 118 . . . VMX 120. In practice, the virtualized computing environment 100 may include any number of hosts (also known as a computing devices, host computers, host devices, physical servers, server systems, physical machines, etc.), wherein each host may be supporting tens or hundreds of virtual machines. For the sake of simplicity, the details of only the single VM1 118 is shown and described herein.

VM1 118 may be a guest VM that includes a guest operating system (OS) 122 and one or more guest applications 124 (and their corresponding processes) that run on top of the guest OS 122. The guest OS 122 includes a kernel 128. VM1 118 includes a guest agent 126. The guest agent 126 of various embodiments may be in the form of a kernel driver. The guest agent 126 may run as part of the guest OS 122 in some embodiments. Further details of the features and use of the guest agent 126 will be described later below with respect to FIGS. 2-7. One or more of the guest OS 122, the guest application(s) 124, the guest agent 126, and other code and related data (including data structures) associated with operating VM1 118 may be stored in a guest memory space that is provisioned for VM1 118 and/or in some other storage location in host-A 110A. The guest memory space allocated/provisioned for VM1 118 is graphically represented by a guest memory 138 in FIG. 1.

The hypervisor-A 116A may be a software layer or component that supports the execution of multiple virtualized computing instances. The hypervisor-A 116A may run on top of a host operating system (not shown) of the host-A 110A or may run directly on hardware 114A. The hypervisor 116A maintains a mapping between underlying hardware 114A and virtual resources (depicted as virtual hardware 130) allocated to VM1 118 and the other VMs.

Hardware 114A in turn includes suitable physical components, such as central processing unit(s) (CPU(s)) or processor(s) 132A; storage device(s) 134A; and other hardware 136A such as physical network interface controllers (NICs), storage disk(s) accessible via storage controller(s), etc. Virtual resources (e.g., the virtual hardware 130) are allocated to each virtual machine to support a guest operating system (OS) and application(s) in the virtual machine, such as the guest OS 122 and the application(s) 124 (e.g., a word processing application, accounting software, a browser, etc.) in VM1 118. Corresponding to the hardware 114A, the virtual hardware 130 may include a virtual CPU, a virtual memory (including the guest memory 138), a virtual disk, a virtual network interface controller (VNIC), etc.

In one embodiment, a guest monitoring mode (GMM) module 140 may reside in a secure memory space that is created for VM1 118 by the hypervisor-A 116A. The secure memory space of VM1 118 (for the GMM module 140) may be a region of memory in a guest memory address space of VM1 118 that is isolated from, and thus inaccessible by, other processes running in the VM1 118 (including privileged processes like the kernel 128 of the guest OS 122). Thus, any code running in the GMM module 140 cannot be compromised via attacks within VM1 118, including attacks that target or otherwise maliciously attempt to modify the guest OS 122.

The GMM module 140 of one embodiment may be a software program or other computer-readable and computer-executable instructions/code, such as a GMM application that is created by a security vendor and loaded by the hypervisor-A 116A into the isolated guest memory address space of VM1 118. The code of the GMM module 140 may be run using guest resources of VM1 118 (e.g., the virtual CPU, the virtual memory, etc. of the virtual hardware 130). As explained above, the guest OS 122 running in VM1 118 does not have visibility into the GMM module 140 (e.g., the guest OS 122 and/or other elements of VM1 118 do not know of the existence of the GMM module 140, or may know of the existence of the GMM module 140 but do not have read/write access rights into the memory space where the GMM module 140 resides). Contrastingly according to one embodiment, the GMM module 140 has read/write access into the state of VM1 118 (e.g., the state of the memory, registers, processes, guest OS 122, applications 124, etc. of VM1 118). In some implementations, the GMM module 140 may be provided with such visibility into the state of VM1 118 via the guest agent 126 or via some other way independently of the guest agent 126.

For example, the guest agent 126 that runs in conjunction with the guest OS 122 is aware of the state of the guest OS, memory, registers, processes, applications 124, etc. of VM1 118 and can report this state information to the GMM module 140 via a hypercall or other form of communication. Thus, while the GMM module 140 by itself may lack context in some situations as to what is executing in VM1 118, the GMM module 140 can be informed of the state information of VM1 118 via the hypercall from the guest agent 126.

A security program may run on top of or within the hypervisor-A 116A, or may run within or may be installed at other locations within the host-A 110A. The security program may be configured in one embodiment to receive alerts from the GMM module 140 about possible malicious code, and to take a remedial action in response to an alert from the GMM module 140. For example, the security program may take remedial actions such as shutting down VM1 118, disabling the guest OS 122, sending a report to a management server 142 so as to enable a system administrator to further evaluate the alert(s) from the GMM module 140, etc. In some embodiments, the GMM module 140 can be a part (sub-component) of the security program. Furthermore, the security program can be a single discrete program in the host-A 110A or can be a distributed program within the virtualized computing environment 100.

The management server 142 of one embodiment can take the form of a physical computer with functionality to manage or otherwise control the operation of host-A 110A . . . host-N 110N. In some embodiments, the functionality of the management server 142 can be implemented in a virtual appliance, for example in the form of a single-purpose VM that may be run on one of the hosts in a cluster or on a host that is not in the cluster. The functionality of the management server 142 may be accessed via one or more user devices 146 that are operated by a system administrator. For example, the user device 146 may include a web client 148 (such as a browser-based application) that provides a user interface operable by the system administrator to view and evaluate alerts provided by the GMM module 140 to the management server 142. The system administrator may then operate the user interface of the web client 148 to facilitate the implementation of a remedial action, such as shutting down a VM, disabling a guest OS, debugging, troubleshooting, etc.

The management server 142 may be communicatively coupled to host-A 110A host-N 110N (and hence communicatively coupled to the virtual machines, hypervisors, agents, GMM modules, hardware, etc.) via the physical network 112. The host-A 110A host-N 110N may in turn be configured as a datacenter that is managed by the management server 142. In some embodiments, the functionality of the management server 142 may be implemented in any of host-A 110A host-N 110N, instead of being provided as a separate standalone device such as depicted in FIG. 1.

Depending on various implementations, one or more of the physical network 112, the management server 142, and the user device(s) 146 can comprise parts of the virtualized computing environment 100, or one or more of these elements can be external to the virtualized computing environment 100 and configured to be communicatively coupled to the virtualized computing environment 100.

Verifying the Authenticity of a Hypercall

As previously explained above, there may be potentially malicious code in the VM1 118 that could issue a hypercall to the GMM module 140 that impersonates a hypercall from the trusted guest agent 126. If the GMM module 140 mistakenly accepts this (potentially malicious) hypercall as being authentic (non-malicious), then malicious process(es) from the potentially malicious code could be allowed to continue execution to the detriment of the VM1 118 without the knowledge of security management software. Hence, described next below are various techniques that can be used by the GMM module 140 to authenticate hypercalls. These techniques may be used singly or in combination in various implementations.

Figure 2:
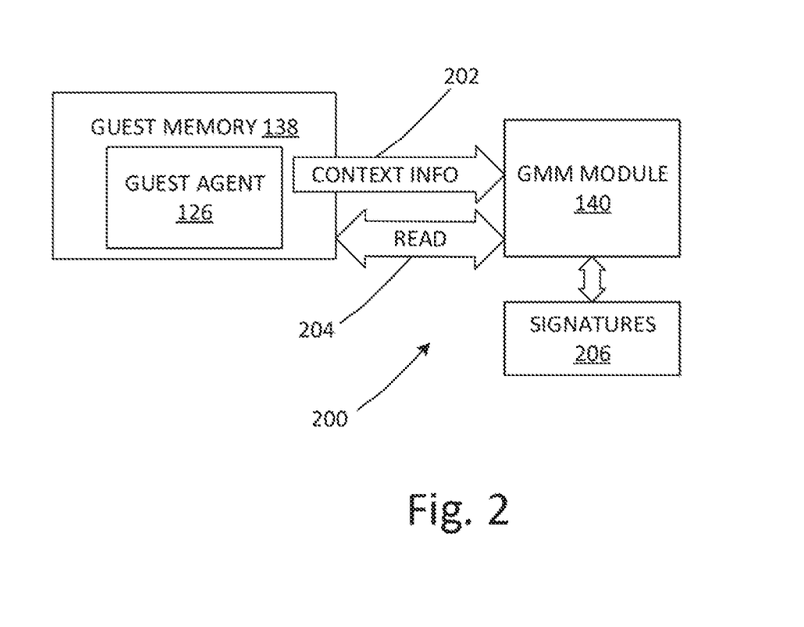
FIG. 2 is a diagram illustrating some of the elements in the virtualized computing environment of FIG. 1 that cooperate to perform a first technique to authenticate a hypercall.

FIG. 2 is a diagram illustrating at least some of the elements in the virtualized computing environment 100 of FIG. 1 that cooperate to perform a first technique 200 to authenticate a hypercall. Specifically with this first technique 200, the GMM module 140 determines whether the guest agent 126 itself is authentic.

In operation, the guest agent 126 is loaded into the guest memory 138 during the boot sequence for VM1 118 wherein the guest agent 126 assumes a root of trust role. The guest agent 126 gathers context information about the VM1 188 (including context information for the guest OS 122) and reports (shown at 202) the context information to the GMM module 140. The context information may be reported at 202 via a hypercall or other form of communication.

In response to receiving the context information, the GMM module 140 reads (shown at 204) the guest memory 138 to obtain a copy of the guest agent 126 and its signature. The GMM module 140 compares the obtained signature against a list of trusted signatures 206 maintained by the GMM module 140. If the GMM module 140 determines that the obtained signature matches one of the signatures in the list of trusted signatures 140, then the GMM module 140 concludes that an authentic version of the guest agent 126 has been loaded in the guest memory 138 for use by the guest OS 122. Example techniques for signature verification of guest components are described in U.S. Pat. No. 9,531, 547, which is incorporated herein by reference in its entirety.

With the guest agent 126 thus being authenticated via this first technique 200, the GMM module 140 can thereafter presume that any hypercalls confirmed as originating from the guest agent 126 are themselves authentic as well, subject to certain conditions and circumstances as will be described further below with respect to FIGS. 4-7.

Figure 3:
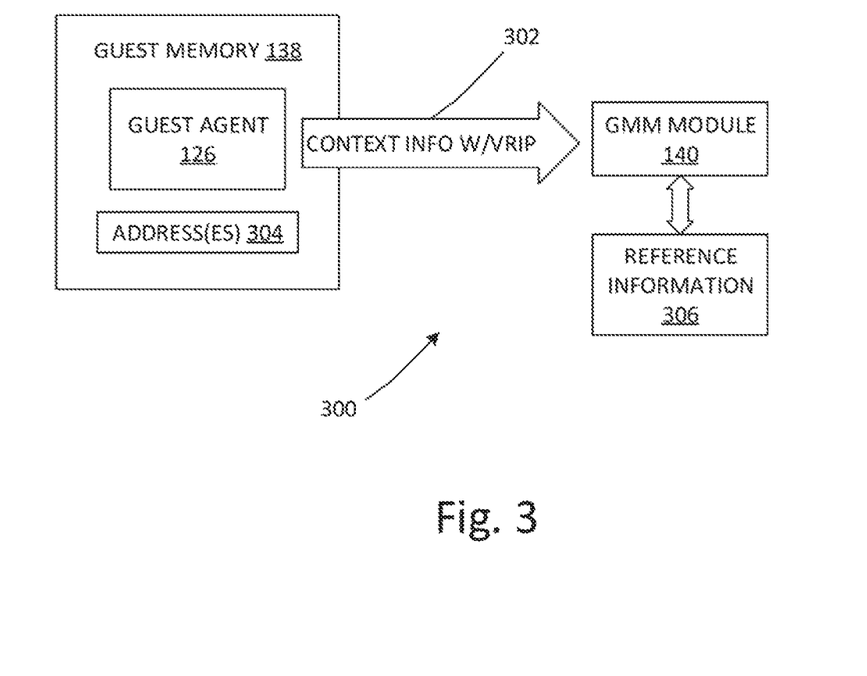
FIG. 3 is a diagram illustrating some of the elements in the virtualized computing environment of FIG. 1 that cooperate to perform a second technique to authenticate a hypercall.

FIG. 3 is a diagram illustrating some of the elements in the virtualized computing environment 100 of FIG. 1 that cooperate to perform a second technique 300 to authenticate a hypercall. As with the first technique 200 shown in FIG. 2, the second technique 300 involves the guest agent 126 being loaded into the guest memory 138 during the boot sequence of the VM1 118. Similarly, the guest agent 126 gathers the context information for the VM1 118 (including context information for the guest OS 122) and reports (shown at 302) the context information to the GMM module 140 via a hypercall or other form of communication.

When reporting the context information at 302, the guest agent 126 includes (along the context information) one or more virtual return instruction pointers (VRIPs) from where the guest agent 126 will issue hypercalls. For example, a VRIP may point to or return to one or more trusted addresses 304 in the guest memory 138 where code of the guest agent 126 is resident and which will be issuing hypercalls.

The GMM module 140 ensures that VRIP(s) are within the range of memory addresses belonging to the guest agent 126, and then registers or otherwise stores the VRIP(s) that it received along with the context information, as reference information 306 (e.g., a whitelist). Thereafter, when the GMM module 140 receives hypercalls, the GMM module 140 is able to compare the VRIP associated with each hypercall to the stored VRIPs stored as the reference information 306. If the VRIP associated with the hypercall does not match any of the stored VRIPs in the reference information 306, then this condition indicates that the hypercall originated from and will return to one or more addresses in the guest memory 138 that are outside of the trusted address(es) 304. As such, the GMM module 140 fails the authentication of the hypercall (e.g., concludes that the hypercall was issued by potentially malicious code), and the GMM module 140 can thereafter take an appropriate remedial action.

While the first technique 200 and the second technique 300 described above are effective under some circumstances to enable the GMM module 140 to some identify hypercalls that may have been issued by malicious code, such techniques have drawbacks that can be exploited by malicious code. For example, performing either or both the first technique 200 and the second technique 300 may not prevent malicious code in the VM1 118 from performing a control flow attack, or from using return-oriented programming (ROP) to issue malicious hypercalls from a legitimate VRIP. For instance, the malicious code can craft a malicious stack frame, insert the malicious stack frame in a control flow stack, and then jump to the instruction in the control flow stack from the guest agent that issued the hypercall, so as to link the instruction or hypercall to the malicious stack frame. This type of attack may not be detectable by the second technique 300, since the hypercall is still originating from a legitimate VRIP.

Accordingly, various techniques will be described next, wherein the GMM module 140 uses thread information, associated with hypercalls and their related processes/threads, to determine whether the hypercalls are authentic. As will be described for these various techniques, the thread information may include pointers to threads that issue hypercalls, call stack chain information associated with the threads, or other data (including data structures) associated with processes/threads that occur in connection with issuing a hypercall.

Figure 4:
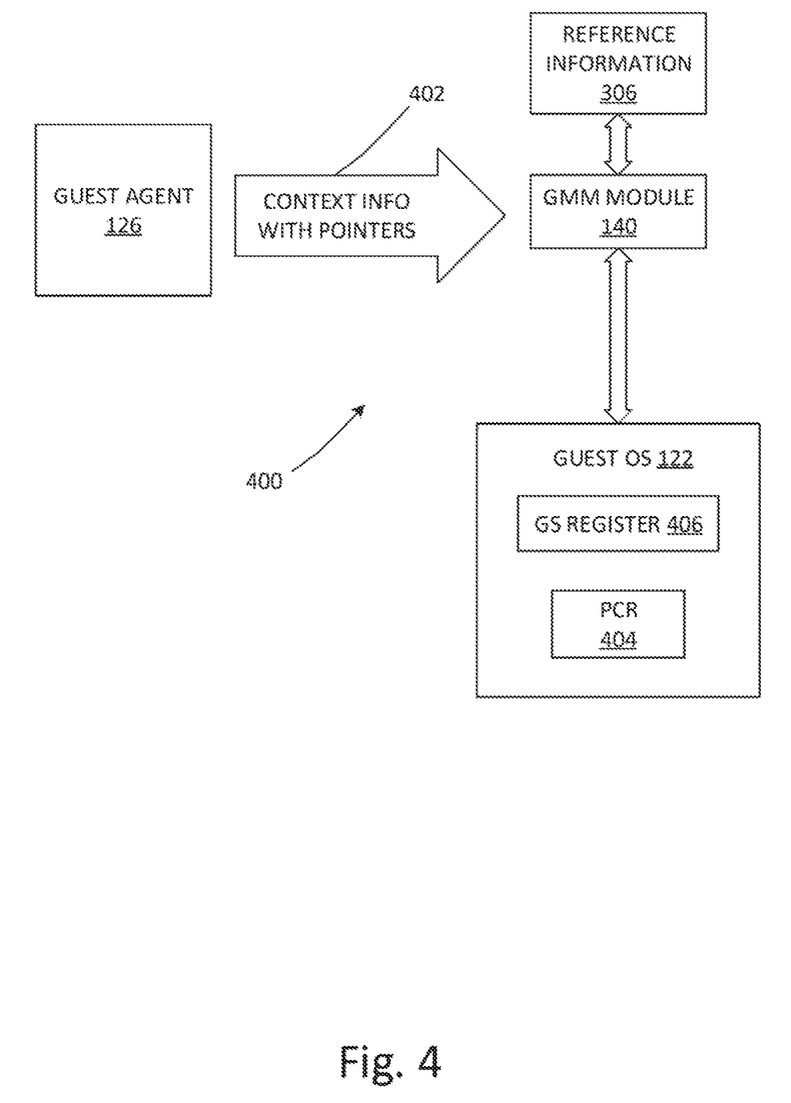
FIG. 4 is a diagram illustrating some of the elements in the virtualized computing environment of FIG. 1 that cooperate to perform a third technique to authenticate a hypercall.

FIG. 4 is a diagram illustrating some of the elements in the virtualized computing environment 100 of FIG. 1 that cooperate to perform a third technique 400 to authenticate a hypercall, using thread information. As in the preceding techniques 200 and 300, the guest agent 126 gathers and reports (shown at 402) context information to the GMM module 140 during the boot sequence of the VM1 118.

As part of the context information reported at 402, the guest agent 126 also reports pointers to threads that will issue hypercalls (e.g., threads, created by the guest agent 126, that will issue hypercalls) to the GMM module 140, and the GMM module 140 then registers/stores the threads and/or their pointers (or other identification of the threads) as trusted thread information amongst the reference information 306. In one example implementation wherein the guest OS 126 is Microsoft Windows®, the threads are KTHREADs, and the guest OS 126 maintains a data structure that identifies and tracks the execution of currently running KTHREADs. Such data structure can be in the form of or stored in a processor control region (PCR) 404 maintained by the guest OS 122, and the thread information in the PCR 404 is in turn accessible via a GS register 406 or other interface.

When the GMM module 140 subsequently receives a hypercall, the GMM module 140 accesses the PCR 404 via the GS register 406 to determine the current KTHREAD associated with that received hypercall. The GMM module 140 then compares this determined KTHREAD to the registered KTHREADs stored in the reference information 306, so as identify a match or a mismatch. If the GMM module 140 identifies a match between the KTHREADs, then the GMM module 140 can whitelist the hypercall and conclude that the hypercall was legitimately issued by the guest agent 126. However, if the GMM module 140 does not find a registered KTHREAD that matches the KTHREAD associated with the received hypercall, then the GMM module 140 fails the authentication of the hypercall and considers the hypercall to have been issued by potentially malicious code. The GMM module 140 can thereafter initiate a remedial action, or can perform other process(es) such as described next below to further confirm whether the hypercall may have been issued by potentially malicious code, and the GMM module 140 can then initiate an appropriate remedial action.

The third technique 400 is advantageous for several reasons. For example, it is extremely difficult to spoof the current KTHREAD that is in the PCR 404 without causing side effects on the guest OS 122 or its scheduler. Thus, the chances of potentially malicious code successfully tampering with KTHREAD information, while escaping detection, is low. Furthermore, since thread information that identifies specific threads is being examined by the GMM module 140 (rather than the GMM module 140 examining VRIPs or other address information that may not uniquely identify threads), the GMM module 140 is provided with further enhanced capability to detect potentially malicious code that the techniques 200 or 300 may not have been able to detect.

Continuing with the present discussion regarding authenticating hypercalls based on thread information, there may be some instances wherein the guest agent 126 issues hypercalls in an arbitrary thread context. For example and as previously explained above, the guest agent 126 registers hooks with the guest OS 122, so that the guest agent 126 is notified by the guest OS 122 whenever there is an event such as a creation, start, exit, etc. of a process/thread, and then the guest agent 126 can issue a hypercall to the GMM module 140 to notify the GMM module 140 of the process/thread. However, it may not be possible to whitelist such threads upfront since such threads can happen in an arbitrary guest context. Accordingly, described next are techniques for the GMM module 140 to walk (e.g., traverse) through a call stack chain or thread stack, so as to determine and ensure that the call stack chain is valid and not associated with a spoofed hypercall by potentially malicious code.

Figure 5:
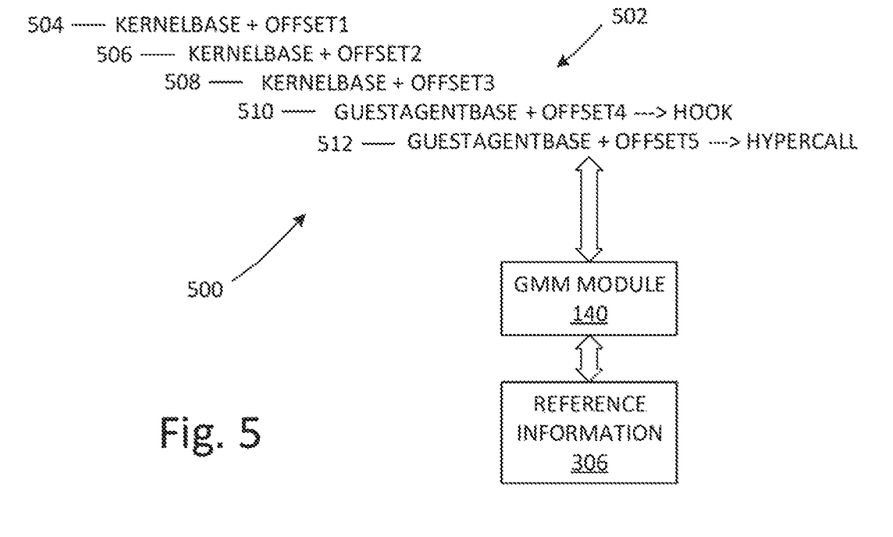
FIG. 5 is a diagram illustrating some of the elements in the virtualized computing environment of FIG. 1 that cooperate to perform a fourth technique to authenticate a hypercall.

FIG. 5 is a diagram illustrating some of the elements in the virtualized computing environment 100 of FIG. 1 that cooperate to perform a fourth technique 500 to authenticate a hypercall. A call stack chain 502 includes a plurality of example stack elements 504-512. The stack elements 504-512 may include or identify, for instance, a function call, a caller of a function, a caller of the caller of the function, data (including a data structure), or other elements associated with execution of a thread. Such stack elements 504-512 may be identified by or located in addresses in the guest memory 138, denoted in FIG. 5 in terms of a kernel base address and a guest agent address and their respective offsets. For example, stack elements 504-508 may be identified via the kernel base address and respective offsets 1-3, while stack elements 510-512 may be identified the guest agent base address and respective offsets 4-5. The stack elements are executed in the thread in the sequence of 504 to 512 (e.g., a downward execution flow in the call stack chain 502). This call stack chain 502 is essentially representing the chain of function calls within the address range of code of the kernel 128 and code of the guest agent 126 that leads to making a hypercall.

The stack element 510 is registered (with the guest OS 122) as a hook by the guest agent 126, such that when the stack element 510 is reached during the execution of the thread, the GMM module 140 learns of the completion of that stage of execution. The GMM module 140 learns that the guest agent 126 has reached that stage of execution, due to an invisible breakpoint, as will be described further below with respect to FIG. 6, wherein the invisible breakpoints are placed on all of the locations on the call stack chain 502 to ensure that the guest agent 126 has executed through all of those locations before a hypercall at a stack element 512 is made to the GMM module 140.

For monitoring and authentication purposes, the GMM module 140 first registers or otherwise stores a static list or copies of trusted call stack chains as the reference information 306. In one embodiment, the GMM module 140 can use automated tools to determine call stack chains to store in the reference information 306 as whitelisted call stack chains. Thereafter, whenever a thread is executed in the VM1 118 (for instance, a thread is executed by the guest OS 122), the GMM module 140 traverses the call stack chain associated with that thread, so as to confirm whether that call stack chain adheres to or otherwise matches a whitelisted call stack chain in the reference information 306 during the course of executing the thread. The GMM module 140 determines that the thread (and associated hypercall) is authentic, if the stack elements in that thread's call stack chain are executed in the same sequence as the stack elements in the whitelisted call stack chain. Deviations in or omissions from the execution sequence can be deemed by the GMM module 140 as being associated with a hypercall issued by potentially malicious code.

Figure 6:
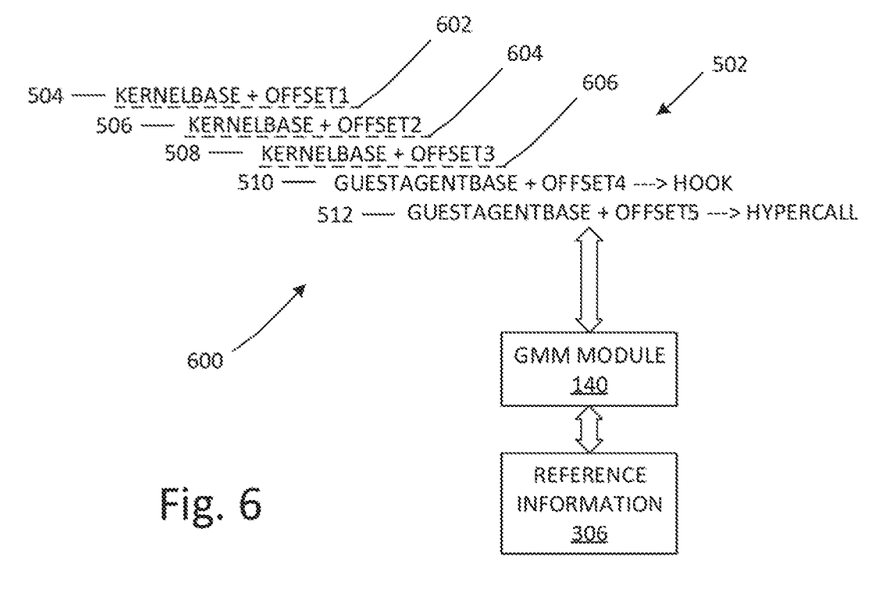
FIG. 6 is a diagram illustrating some of the elements in the virtualized computing environment of FIG. 1 that cooperate to perform a fifth technique to authenticate a hypercall.

FIG. 6 is a diagram illustrating some of the elements in the virtualized computing environment 100 of FIG. 1 that cooperate to perform a fifth technique 600 to authenticate a hypercall. The fifth technique 600 is similar in some respects to the fourth technique 500, except that with the fifth technique 600, the GMM module 140 and the VM1 118 (including the guest OS 122 and the guest agent 126) are placed in a learning mode. In this learning mode, the GMM module 140 captures the call stack chains for all hypercalls issued by the guest agent 126, and records the captured call stack chains as the reference information 306. After the learning mode is completed, a fully operational mode can be entered wherein the GMM module 140 compares call stack chains against the reference information 306 to determine the authenticity of hypercalls associated with the call stack chains.

In some implementations, malicious code may be able to spoof a call stack chain to exactly match what the GMM module 140 expects to see (without actually executing the stack elements at the locations in the call stack chain), and then the malicious code can jump to the location in the call stack chain that issues the hypercall. To defend against this, the GMM module 140 in the fifth technique 600 places a hidden/invisible breakpoint at one or more locations in the call stack chain 502. Invisible breakpoints 602-606 are represented by broken lines in FIG. 6.

Thus, the GMM module 140 can keep track of how far the current thread (e.g., KTHREAD) has executed in the call stack chain 502, wherein each breakpoint 602-606 etc. is each reached, after the corresponding stack element completes its execution. The GMM module 140 allows or authenticates the hypercall at stack element 512, only if all of the preceding stack elements 504-510 have completed execution at their respective locations in the call stack chain 502 (e.g., when respective breakpoints 602-606 etc. are reached).

According to some embodiments, the guest OS 122 may be provided with kernel patch protection (KPP) software. The KPP software, if provided, is configured to monitor for (and prevent) modification of the code of the kernel 128.

Therefore in one embodiment, a transparent code patching technique may be used to insert the invisible breakpoints (e.g., invisible markers or triggers) at execution points in the code of the kernel 128. Specifically in an example transparent code patching technique, the GMM module 140 in cooperation with the hypervisor-A 116A can patch or otherwise modify the kernel 128 of the guest OS 122 (in order to insert the invisible breakpoints in the kernel code and to notify the GMM module 140 when these invisible breakpoints are triggered in the execution stream), in the presence of the KPP software that would otherwise prevent the patching of the kernel 128.

With such a technique, the GMM module 140 can patch the kernel 128 in order to enable interception/detection of various events during the execution of the patched code of the kernel 128 (e.g., during execution of a thread corresponding to the call stack chain 502), while concurrently rendering the patch undetectable by the KPP software. This capability may be provided by having the GMM module 140 and the hypervisor-A 116A present the patched code in an execution stream of the guest OS 122, while the original (unpatched) code is presented to the KPP software in a data stream. Examples of transparent code patching techniques are described in U.S. patent application Ser. No. 15/643,503 (published as U.S. Patent Application Publication No. 2018/0307516), entitled "TRANSPARENT CODE PATCHING USING A HYPERVISOR," filed on Jul. 7, 2017, now U.S. Pat. No. 10,620,985, which is incorporated herein by reference in its entirety.

Figure 7:
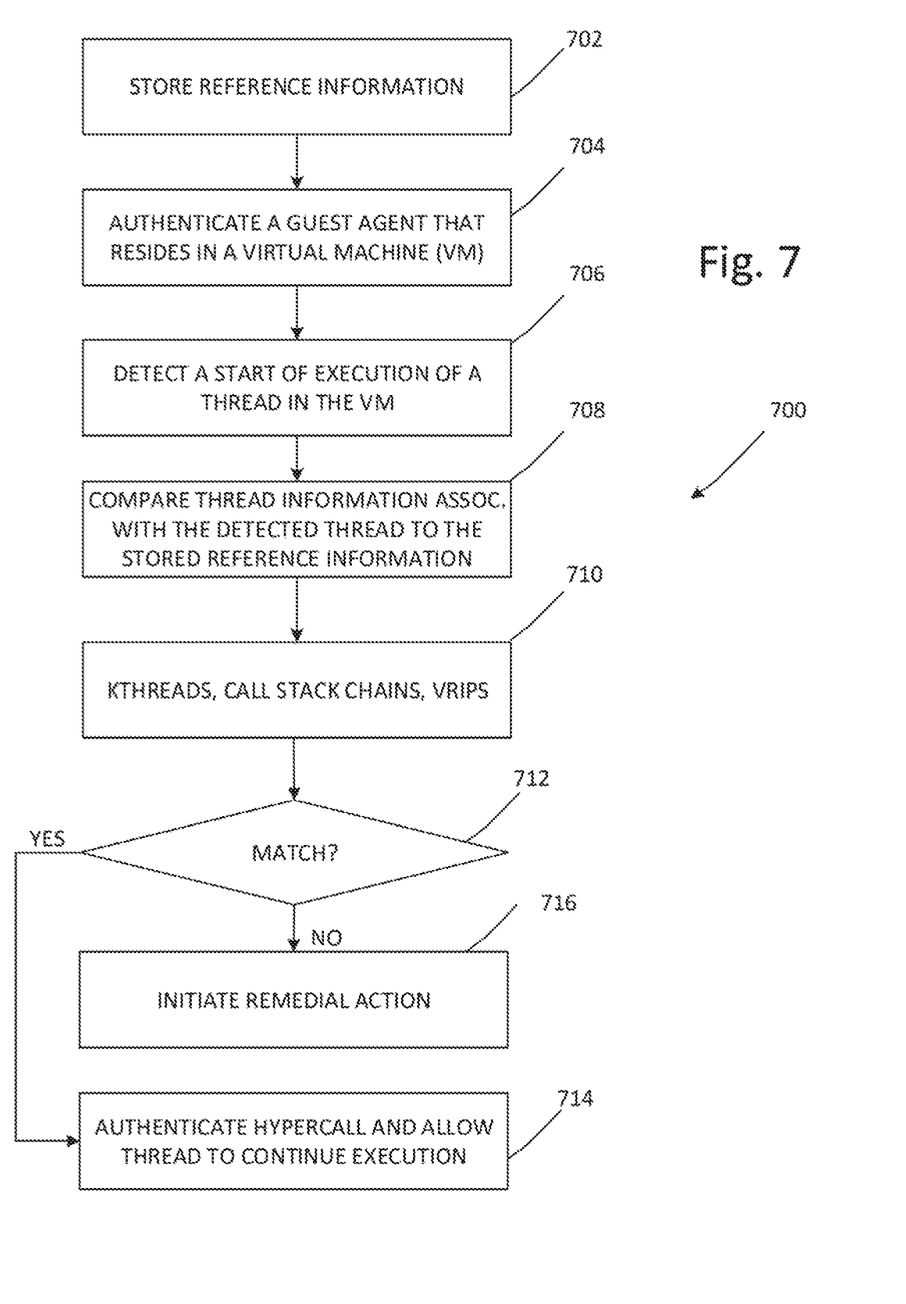
FIG. 7 is a flowchart of an example method to authenticate hypercalls in the virtualized computing environment of FIG. 1.

FIG. 7 is a flowchart of an example method 700 to authenticate hypercalls in the virtualized computing environment 100 of FIG. 1. Example method 700 may include one or more operations, functions, or actions illustrated by one or more blocks, such as blocks 702 to 716. The various blocks of the method 700 and/or of any other process(es) described herein may be combined into fewer blocks, divided into additional blocks, supplemented with further blocks, and/or eliminated based upon the desired implementation. In one embodiment, the operations of the method 700 and/or of any other process(es) described herein may be performed in a pipelined sequential manner. In other embodiments, some operations may be performed out-of-order, in parallel, etc.

According to one embodiment, the method 700 may be performed by the GMM module 140 in cooperation with the guest agent 126 and the management server 142. For example, the GMM module 140 may be a sub-component of a security program controlled by the management server 142, and the security program may in turn control or operate the guest agent 126 and the GMM module 140.

At a block 702 ("STORE REFERENCE INFORMATION"), the GMM module 140 stores various pieces of information as the reference information 306, for instance to be used as a whitelist or for validation of a call stack chain. As previously described above, the GMM module 140 can obtain pointers to KTHREADS, VRIPs, and other thread-related information pertaining to trusted hypercalls when the guest agent 126 reports context information to the GMM module 140 during the boot sequence of the VM1 118. Furthermore at the block 702, the GMM module 140 can determine call stack chains that corresponds to trusted threads, for instance during a learning mode of the GMM module 140 also as previously explained above.

The block 702 may be followed by a block 704 ("AUTHENTICATE A GUEST AGENT THAT RESIDES IN A VIRTUAL MACHINE (VM)"), wherein the GMM module 140 obtains a copy of the guest agent 140 and its signature during the boot process of the VM1 118. The GMM module 140 determines the authenticity of the guest agent 126 by comparing the obtained signature with trusted signatures 206 which may be stored as part of in the reference information 306, so as to confirm that the signatures match (thereby indicating that the guest agent 126 is authentic/trusted).

The block 704 may be followed by a block 706 ("DETECT A START OF EXECUTION OF A THREAD IN THE VM"), wherein the GMM module 140 detects that a thread is beginning to execute in the VM1 118. For instance, the guest agent 126 may inform the GMM module 140 of the start of execution of a thread via a hypercall and/or the guest agent 126 may detect execution in other ways.

The block 706 may be followed by a block 708 ("COMPARE THREAD INFORMATION ASSOC. WITH THE DETECTED THREAD TO THE STORED REFERENCE INFORMATION") in which the GMM module 140 determines whether any hypercalls associated with the thread is trusted or not trusted (e.g., potentially malicious). At a block 710 ("KTHREADS, CALL STACK CHAINS, VRIPS"), the GMM module 140 determines if the hypercall and/or its associated thread are potentially malicious, for example by examining the thread's information that pertains to KTHREADs, VRIPs, and call stack chains, and determining whether this thread information matches the trusted thread information that was stored as the reference information at the block 702.

If there is a match ("YES" at a block 712), then the GMM module 140 authenticates the hypercall and its associated thread as being trusted, and permits the thread to continue execution at a block 714 ("AUTHENTICATE HYPERCALL AND ALLOW THREAD TO CONTINUE EXECUTION").

However, if the GMM module 140 determines that there is a mismatch between the thread information and the trusted thread information ("NO" at the block 712), then the GMM module 140 initiates a remedial action at a block 716 ("INITIATE REMEDIAL ACTION"). The remedial action initiated at the block 716 to address or otherwise respond to the failed authentication of the hypercall and/or its associated thread can include one or more of: shutting down the guest OS 122, shutting down the VM, sending an alert to the management server 142 to enable a system administrator to further investigate the hypercall and thread (and the system administrator can then determine and take any further appropriate remedial action), etc.

Computing Device

The above examples can be implemented by hardware (including hardware logic circuitry), software or firmware or a combination thereof. The above examples may be implemented by any suitable computing device, computer system, etc. The computing device may include processor(s), memory unit(s) and physical NIC(s) that may communicate with each other via a communication bus, etc. The computing device may include a non-transitory computer-readable medium having stored thereon instructions or program code that, in response to execution by the processor, cause the processor to perform processes described herein with reference to FIGS. 2-7. For example, computing devices capable of acting as host devices may be deployed in virtualized computing environment 100.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

Although examples of the present disclosure refer to "virtual machines," it should be understood that a virtual machine running within a host is merely one example of a "virtualized computing instance" or "workload." A virtualized computing instance may represent an addressable data compute node or isolated user space instance. In practice, any suitable technology may be used to provide isolated user space instances, not just hardware virtualization. Other virtualized computing instances may include containers (e.g., running on top of a host operating system without the need for a hypervisor or separate operating system; or implemented as an operating system level virtualization), virtual private servers, client computers, etc. The virtual machines may also be complete computation environments, containing virtual equivalents of the hardware and system software components of a physical computing system. Moreover, some embodiments may be implemented in other types of computing environments (which may not necessarily involve a virtualized computing environment), wherein it would be beneficial to determine the authenticity of hypercalls or other type of communication.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood that each function and/or operation within such block diagrams, flowcharts, or examples can be implemented, individually and/or collectively, by a wide range of hardware, software, firmware, or any combination thereof.

Some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware are possible in light of this disclosure.

Software and/or other instructions to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. The units in the device in the examples can be arranged in the device in the examples as described, or can be alternatively located in one or more devices different from that in the examples. The units in the examples described can be combined into one module or further divided into a plurality of sub-units.

What is claimed is:

1. A method in a virtualized computing environment to authenticate a communication from a guest agent to a guest monitoring mode (GMM) module, the method comprising:
storing, by the GMM module, reference information that pertains to trusted communications from the guest agent to the GMM module, wherein the reference information includes trusted thread information of threads associated with the trusted communications, and wherein the guest agent resides in a virtualized computing instance supported by a host in the virtualized computing environment, wherein storing the reference information includes entering a learning mode, by the GMM module, to capture one or more call stack chains of communications to the GMM module that are issued by the guest agent; or registering, by the GMM module, one or more virtual return instruction pointers (VRIPs) received from the guest agent;
detecting, by the GMM module, a start of execution of a thread in the virtualized computing instance;
comparing, by the GMM module, thread information associated with the detected thread to the trusted thread information;
in response to the comparing being indicative of a mismatch between the thread information and the trusted thread information, determining, by the GMM module, that a communication associated with the detected thread originates from potentially malicious code; and
in response to having determined that the communication is associated with the potentially malicious code, initiating by the GMM module, an alert to take a remedial action.

2. The method of claim 1, wherein the GMM module resides in a hypervisor of the host, and wherein the communication is a hypercall from the virtualized computing instance to the GMM module.

3. The method of claim 1, wherein:
storing the reference information that includes the trusted thread information further includes, receiving, by the GMM module from the guest agent, pointers that identify trusted threads that issue communications to the GMM module, and registering, by the GMM module, the trusted threads, and
comparing the thread information associated with the detected thread to the trusted thread information includes determining, by the GMM module, whether the detected thread is one of the registered trusted threads.

4. The method of claim 1, wherein:
storing the reference information that includes the trusted thread information further includes, determining, by the GMM module, call stack chains that correspond to execution of trusted threads that issue communications to the GMM module, and registering, by the GMM module, the determined call stack chains, and
comparing the thread information associated with the detected thread to the trusted thread information includes traversing, by the GMM module, through stack elements in a call stack chain that corresponds to execution of the detected thread so as to determine whether the call stack chain adheres to one of the registered call stack chains.

5. The method of claim 1, wherein the method further comprises:
for kernel code of a guest operating system (OS) of the virtualized computing instance that corresponds to captured call stack chains, placing, by the GMM module, hidden breakpoints in the kernel code to enable the GMM module to verify that stack elements in the call stack chains have been executed at the breakpoints.

6. The method of claim 1, wherein:
storing the reference information that includes the trusted thread information further includes, receiving, by the GMM module from the guest agent, the VRIPs that identify memory locations from which trusted communications to the GMM module will be issued by the guest agent, and
comparing the thread information associated with the detected thread to the trusted thread information includes determining, by the GMM module, whether a VRIP associated with the communication corresponds to one of the registered VRIPs.

7. The method of claim 1, further comprising authenticating, by the GMM module, the guest agent through signature verification to determine whether the guest agent is trusted.

8. A non-transitory computer-readable medium having instructions stored thereon, which in response to execution by one or more processors in a virtualized computing environment, cause the one or more processors to authenticate a communication from a guest agent to a guest monitoring mode (GMM) module, the operations comprising:
storing, by the GMM module, reference information that pertains to trusted communications from the guest agent to the GMM module, wherein the reference information includes trusted thread information of threads associated with the trusted communications, and wherein the guest agent resides in a virtualized computing instance supported by a host in the virtualized computing environment, wherein storing the reference information includes entering a learning mode, by the GMM module, to capture one or more call stack chains of communications to the GMM module that are issued by the guest agent; or registering, by the GMM module, one or more virtual return instruction pointers (VRIPs) received from the guest agent;
detecting, by the GMM module, a start of execution of a thread in the virtualized computing instance;
comparing, by the GMM module, thread information associated with the detected thread to the trusted thread information;
in response to the comparing being indicative of a mismatch between the thread information and the trusted thread information, determining, by the GMM module, that a communication associated with the detected thread originates from potentially malicious code; and in response to having determined that the communication is associated with the potentially malicious code, initiating by the GMM module, an alert to take a remedial action.

9. The non-transitory computer-readable medium of claim 8, wherein the GMM module resides in a hypervisor of the host, and wherein the communication is a hypercall from the virtualized computing instance to the GMM module.

10. The non-transitory computer-readable medium of claim 8, wherein:
storing the reference information that includes the trusted thread information further includes, receiving, by the GMM module from the guest agent, pointers that identify trusted threads that issue communications to the GMM module, and registering, by the GMM module, the trusted threads, and
comparing the thread information associated with the detected thread to the trusted thread information includes determining, by the GMM module, whether the detected thread is one of the registered trusted threads.

11. The non-transitory computer-readable medium of claim 8, wherein:
storing the reference information that includes the trusted thread information further includes, determining, by the GMM module, call stack chains that correspond to execution of trusted threads that issue communications to the GMM module, and registering, by the GMM module, the determined call stack chains, and
comparing the thread information associated with the detected thread to the trusted thread information includes traversing, by the GMM module, through stack elements in a call stack chain that corresponds to execution of the detected thread so as to determine whether the call stack chain adheres to one of the registered call stack chains.

12. The non-transitory computer-readable medium of claim 8, wherein the operations further comprise:
for kernel code of a guest operating system (OS) of the virtualized computing instance that corresponds to captured call stack chains, placing, by the GMM module, hidden breakpoints in the kernel code to enable the GMM module to verify that stack elements in the call stack chains have been executed at the breakpoints.

13. The non-transitory computer-readable medium of claim 8, wherein:
storing the reference information that includes the trusted thread information further includes, receiving, by the GMM module from the guest agent, the VRIPs that identify memory locations from which trusted communications to the GMM module will be issued by the guest agent, and
comparing the thread information associated with the detected thread to the trusted thread information includes determining, by the GMM module, whether a VRIP associated with the communication corresponds to one of the registered VRIPs.

14. The non-transitory computer-readable medium of claim 8, wherein the operations further comprise:
authenticating, by the GMM module, the guest agent through signature verification to determine whether the guest agent is trusted.

15. A host in a virtualized computing environment, the host comprising:
a processor; and
a non-transitory computer-readable medium coupled to the processor and having stored instructions stored thereon, which in response to execution by the processor, provide a guest monitoring mode (GMM) module and a guest agent in a virtualized computing instance supported by the host,
wherein the instructions, further in response to execution by the processor, cause the processor to perform or control performance of operations to authenticate a communication from the guest agent to the GMM module, and wherein the operations include:
store, by the GMM module, reference information that pertains to trusted communications from the guest agent to the GMM module, wherein the reference information includes trusted thread information of threads associated with the trusted communications, wherein storage of the reference information that includes the trusted thread information includes an entry into a learning mode to capture one or more call stack chains of communications to the GMM module that are issued by the guest agent; or one or more registrations of one or more virtual return instruction pointers (VRIPs) received from the guest agent;
detect, by the GMM module, a start of execution of a thread in the virtualized computing instance;
compare, by the GMM module, thread information associated with the detected thread to the trusted thread information;
in response to the comparison being indicative of a mismatch between the thread information and the trusted thread information, determine, by the GMM module, that a communication associated with the detected thread originates from potentially malicious code; and
in response to having determined that the communication is associated with the potentially malicious code, initiate by the GMM module, an alert to take a remedial action.

16. The host of claim 15, wherein the GMM module resides in a hypervisor of the host, and wherein the communication is a hypercall from the virtualized computing instance to the GMM module.

17. The host of claim 15, wherein:
storage of the reference information that includes the trusted thread information further includes, receipt, by the GMM module from the guest agent, of pointers that identify trusted threads that issue communications to the GMM module, and registration, by the GMM module, of the trusted threads, and
comparison of the thread information associated with the detected thread to the trusted thread information includes determination, by the GMM module, whether the detected thread is one of the registered trusted threads.

18. The host of claim 15, wherein:
storage of the reference information that includes the trusted thread information further includes, determination, by the GMM module, of call stack chains that correspond to execution of trusted threads that issue communications to the GMM module, and registration, by the GMM module, of the determined call stack chains, and
comparison of the thread information associated with the detected thread to the trusted thread information includes traversal, by the GMM module, through stack elements in a call stack chain that corresponds to execution of the detected thread so as to determine whether the call stack chain adheres to one of the registered call stack chains.

19. The host of claim 15, wherein the operations further include:

for kernel code of a guest operating system (OS) of the virtualized computing instance that corresponds to captured call stack chains, placement, by the GMM module, of hidden breakpoints in the kernel code to enable the GMM module to verify that stack elements in the call stack chains have been executed at the breakpoints.

20. The host of claim 15, wherein:

storage of the reference information that includes the trusted thread information further includes, receipt, by the GMM module from the guest agent, of the VRIPs that identify memory locations from which trusted communications to the GMM module will be issued by the guest agent, and comparison of the thread information associated with the detected thread to the trusted thread information includes determination, by the GMM module, of whether a VRIP associated with the communication corresponds to one of the registered VRIPs.

21. The host of claim 15, wherein the operations further comprise authenticate, by the GMM module, the guest agent through signature verification to determine whether the guest agent is trusted.

* * * * *